UNITED STATES PATENT OFFICE.

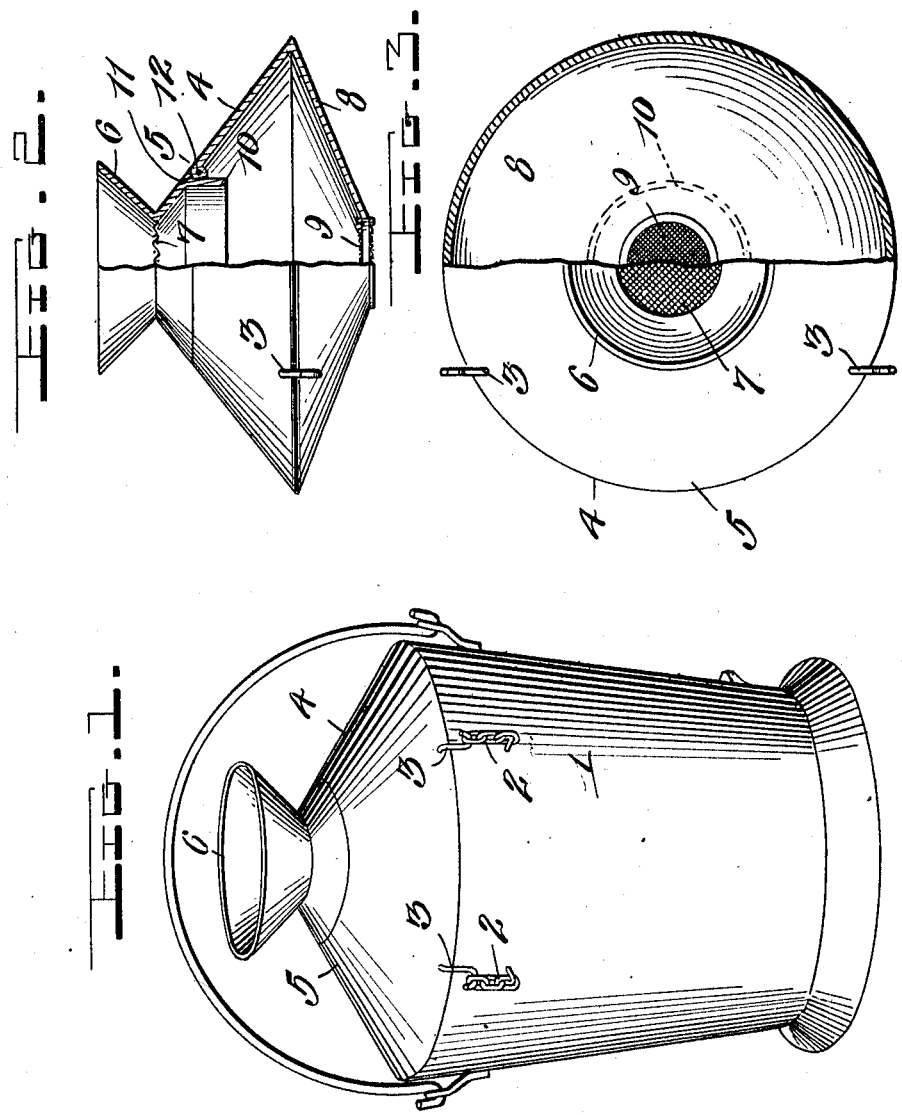

EDWARD FINK, OF NILES, MICHIGAN.

MILK-PAIL.

1,003,726.

Specification of Letters Patent. Patented Sept. 19, 1911.

Application filed April 8, 1911. Serial No. 619,817.

*To all whom it may concern:*

Be it known that I, EDWARD FINK, a citizen of the United States, residing at Niles, in the county of Berrien and State of Michigan, have invented certain new and useful Improvements in Milk-Pails, of which the following is a specification, reference being had to the accompanying drawings.

My invention relates to milk pails and more particularly to milk strainers for milk pails.

The object of my invention is to provide a strainer which will be particularly efficient for straining milk and removing impurities therefrom.

Another object of my invention is to combine in the strainer a funnel and cover so that these parts will not be needed while the strainer is in use.

A further object is to have the strainer easily mounted on or removable from the milk pail.

Other objects will become apparent as my invention is more fully set forth.

In the accompanying drawings which illustrate by way of example an embodiment of my invention, Figure 1 represents a view in perspective of a milk pail with the strainer embodying the invention; Fig. 2 is a view in elevation of a strainer embodying the invention partly in section; and Fig. 3 is a plan view of a strainer partly in section.

Similar characters refer to similar parts throughout the drawings.

In the drawings 1 represents a milk pail provided with a plurality of links 2 fastened on the upper portion thereof for receiving hooks 3 of a milk strainer 4, said hooks being mounted on a cone-cover 5 which is adapted to rest on the edge of the pail 1 and has at its upper end a funnel 6 which has a screen or a strainer 7 at the connected portion of the funnel and the cover. Secured to the bottom rim of the cover 5 is an inverted cone-shaped pan 8 which is provided at its central and lower end with a double-fine wire strainer 9. The lid or cover 5 and the pan 8 serve to form a reservoir for the milk poured in through the strainer 7 before it goes through the strainer 9 into the pail 1.

In order to provide means for access to the interior of the strainer for cleaning and repair purposes, the cover 5 of the strainer is made of two parts, the upper or that attached to the funnel portion being provided with a lip 10 which is arranged to fit inwardly into the lower portion of the cover and have the projection 11 rest on the beaded rim 12 of the lower section, as is clearly shown in Fig. 2 of the drawings. It is, of course, necessary that the fit be made tight or close in order that the parts will not come apart in use, and for other obvious reasons.

In operation the milk is poured into the funnel and is doubly strained before it reaches the interior of the pail as can be readily seen from the drawings. When it is desired to remove the strainer the hooks 3 on the cover 5 are released from the links 2 on the upper portion of the pail and the whole strainer raised up and removed.

The peculiar advantages of this device is that the milk is doubly strained, and because of the reservoir contained in the strainer a large amount of the liquid can be poured in without danger of spilling the same. The advantages of the funnel are obvious.

The particular object of having the upper portion of the milk pail removable as shown in the drawings, is in order to assist in the manufacture of the article, and to permit ready access to be had to the interior for inspection, repairs, and cleaning purposes, thereby enabling the milk can to be kept in a sanitary condition.

Obviously while I have described my strainer with only a pair of straining screens I do not wish to limit myself to this number, neither do I wish to limit myself excepting that necessitated by the prior art as many modifications in the construction can be made without departing from the principles of my invention.

Having thus described my invention, I claim:—

1. A milk strainer comprising in combination an inverted cone-like pan having an opening in the center thereof, a cone-like cover for said pan having an opening in the central upper portion thereof, said cover being split into sections to permit access to the interior of the strainer, a funnel disposed over said cover opening, and wire screens for said openings.

2. A milk strainer comprising in combination an inverted cone-like pan having an opening in the center thereof, a cone-like cover for said pan having an opening in the central upper portion thereof, said cover being in two parts, the upper part having a lip extending downwardly into the lower portion and having projections adapted to rest on the upper edge of said lower portion, a funnel disposed over said cover opening, and wire screens for said openings.

In testimony whereof I hereunto affix my signature in the presence of two witnesses.

EDWARD FINK.

Witnesses:
 GEORGE FUNK,
 CHAS. H. LAFLER.

Copies of this patent may be obtained for five cents each, by addressing the "Commissioner of Patents, Washington, D. C."